US006044535A

United States Patent [19]

Strickland

[11] Patent Number: 6,044,535

[45] Date of Patent: Apr. 4, 2000

[54] BRAKE SPRING MAINTENANCE TOOL AND METHOD

[76] Inventor: James H. Strickland, 1111 County Rd. 417, Minter, Ala. 36761

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,843

[22] Filed: Oct. 21, 1996

[51] Int. Cl.[7] ...................................................... B23P 19/04

[52] U.S. Cl. ............................... 29/225; 29/256; 29/281.6

[58] Field of Search ............................. 29/225, 230, 240, 29/278, 256, 266, 426.6, 226, 227, 281.6, 426.5

[56] References Cited

U.S. PATENT DOCUMENTS

| | | | |
|---|---|---|---|
| 1,563,000 | 11/1925 | Wajer et al. | 29/278 X |
| 1,862,172 | 6/1932 | Bennett | 29/230 |
| 1,986,093 | 1/1935 | Abernathy | 29/225 X |
| 2,113,755 | 4/1938 | Billington | 29/256 |
| 4,031,603 | 6/1977 | Shultz | 29/426.6 |
| 4,075,750 | 2/1978 | Collumber | 29/278 |
| 4,558,500 | 12/1985 | Kloster | 29/227 |
| 4,965,921 | 10/1990 | Priest | 29/426.5 X |

FOREIGN PATENT DOCUMENTS

| | | | |
|---|---|---|---|
| 1299434 | 12/1972 | United Kingdom | 29/225 |

OTHER PUBLICATIONS

Catalog advertisement, one page, for "J 38400 Brake Shoe Spanner & Spring Remover", Kent–Moore Catalog, p. 92, undated.

Photooptically reduced copies of front and rear of product and product packaging for model No. J 38400 G.M. Brake Shoe Spanner & Spring Remover by OTC, a division of SPX Corp. of Owatonna, MN 55060–11711; two pages.

Photooptically reduced copies of front and rear of product and product packaging for model No. 3365 "Brake Spring Pliers" manufactured for NAPA Distribution Centers by Danaher Tool Group, Lancaster, PA; two pages.

*Primary Examiner*—Joseph M. Gorski
*Attorney, Agent, or Firm*—Dority & Manning

[57] ABSTRACT

A tool for brake spring maintenance provides the ability both to release brake springs and then hold them out of the way for removal and replacement of brake shoes or for other maintenance operations related to drum brake arrangements. A main support bar is adapted to be received on an exposed wheel mounting member. The bar has a pair of threaded pins and cooperating threaded nuts for controlled axial movement of the pins. The pins have hooked ends and are situated for engaging respective brake springs whenever the tool is properly positioned on the exposed wheel mounting member. By rotating the threaded nuts to move the pins a set axial distance with the pin hooked ends engaged with the brake springs, such springs can be drawn back from their hold on the brake shoes, to permit disassembly and maintenance of the entire drum brake arrangement. The tool enables both brake springs to be released and held simultaneously, resulting in significant time savings and improved safety for overall drum brake maintenance operations.

17 Claims, 4 Drawing Sheets

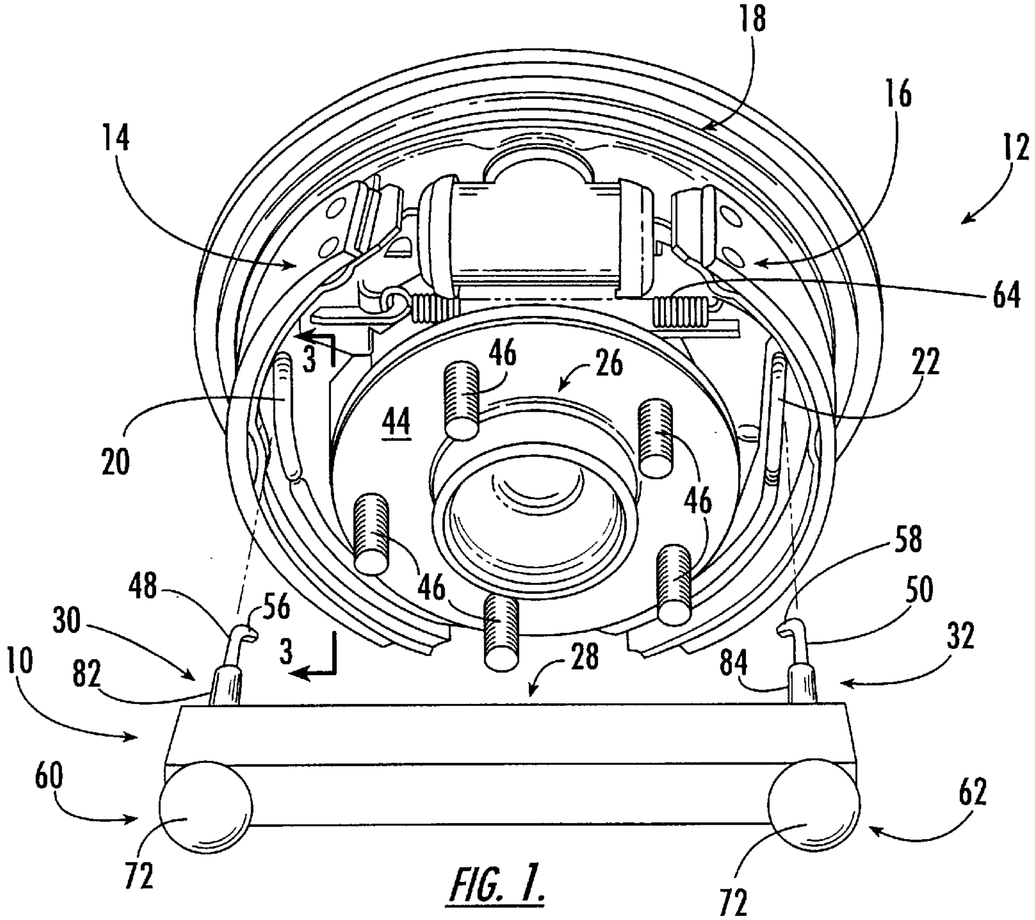
*FIG. 1.*
*FIG. 2.*
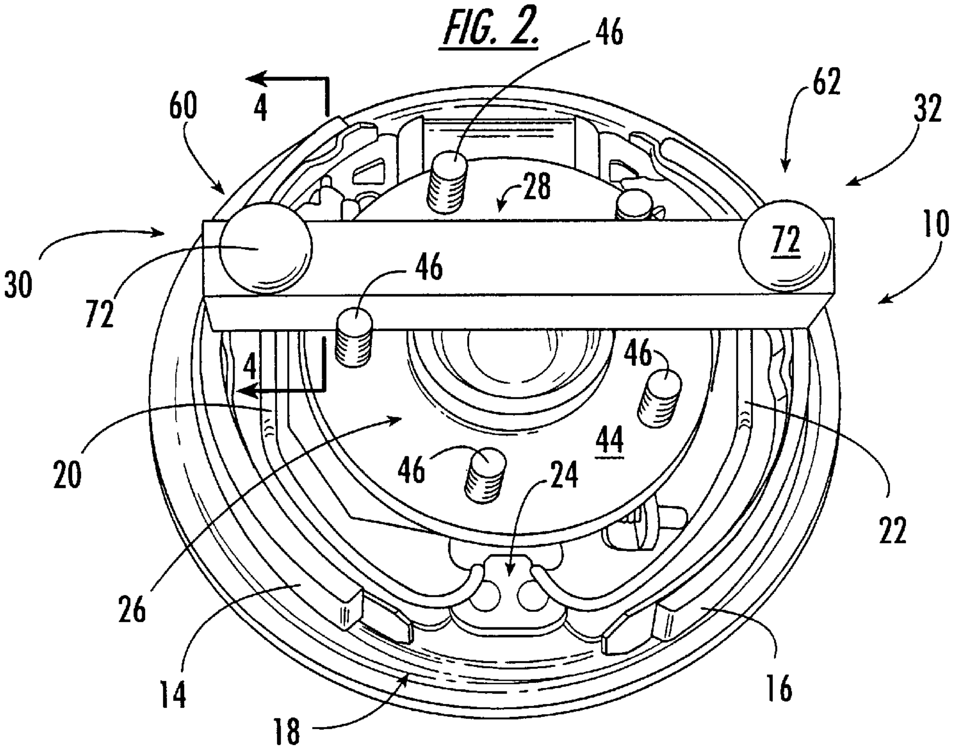

BRAKE SPRING MAINTENANCE TOOL AND METHOD

BACKGROUND OF THE INVENTION

The present invention relates in general to an improved tool and corresponding improved methodology for brake maintenance, and in particular to improved maintenance operations for drum brake arrangements.

A conventional vehicle wheel drive assembly has a brake arrangement operatively configured for selectively slowing and/or stopping rotation of a wheel associated therewith. In a typical arrangement, an exposed wheel flange constitutes a wheel mounting member which is directly connected to either a driven or free turning axle, depending on the drive train arrangement of a particular vehicle and the location of the vehicle wheel drive assembly. The exposed wheel flange typically may include a central hub projecting in an axial direction from the face of the exposed flange. Threaded bolt elements also may project from the exposed flange for direct receipt of openings defined in a corresponding wheel rim, with the wheel then being secured to the wheel mounting member by threaded nuts.

The foregoing arrangement takes up a finite and substantial amount of room in a given wheel drive assembly. Also within the confines of such an assembly is the above-referenced braking mechanism.

One conventional arrangement is referred to as a drum brake arrangement. A drum brake arrangement makes use of two curved brake shoes, which are typically fitted with heat and/or wear resistant linings. Braking operations are achieved by forcing the two curved shoes against the surface of a rotating drum.

Typically, the brake shoes are held into a null or predetermined initial position (during ceased braking operations) by respective brake springs. Such brake springs may comprise resilient cantilevered elements, such as in the case of drum brake arrangements for rear vehicle wheel drive assemblies for General Motors automobiles from 1992 through 1997.

Still other elements are present in typical existing drum brake arrangements, such as a coiled spring for brake self-adjustment, and a brake adjustment element which can be manually set.

In general, maintenance operations concerning such conventional drum brake arrangements are widely known and long standing. For example, heat and/or wear resistant linings of the conventional brake shoes naturally wear out over time and must be inspected and/or replaced. Other functional elements of the conventional drum brake arrangement should also be periodically inspected and/or maintained, as well known to those of ordinary skill in the art.

Routine drum brake maintenance operations typically involve disassembly and re-assembly of the arrangement. With the vehicle wheel dismounted from the wheel mounting member, the wheel flange is exposed for a vehicle technician to perform drum brake maintenance. Typically, the technician must find a way to relieve the spring loading forces which are applied by the respective brake springs to the respective brake shoes. Since the brake shoes are held in place by the springs and cannot be fully inspected and/or maintained until removed, the holding force of the springs must be released for drum brake maintenance operations to take place.

In addition to relieving such spring-loading force, the technician must find a way to hold the released cantilevered brake spring in a restrained position while the brake shoes are removed and/or reinserted. Alternatively, old brake shoes are removed and new brake shoes or old brake shoes with new linings are repositioned during the course of brake maintenance.

Typical technician operations have often times simply involved a "brute force" approach, utilizing pliers and/or screwdrivers for prying and holding a cantilevered brake spring from a respective brake shoe. Such approach generally has only mixed success, is time consuming, is potentially dangerous to the technician or other bystanders, and addresses only one brake shoe at a time.

The above conventional methodology is also unreliable in the sense of the "trial and error" approach which must be taken in efforts to grasp, remove, and hold the cantilevered brake spring. The difficulty factor is also raised due to the fact that the technician is attempting to operate against the force of the spring, at the same time that they need to use their hands to physically dislodge and/or remove the brake shoe once released from the force of the brake spring.

The net result is a time consuming, unsatisfactory aspect of typical drum brake maintenance operations.

Several companies make specialized forms of pliers, comprising basically enlarged tongs, some more than a foot long. Specifically, they generally comprise X-shaped scissor action specialized pliers, with a hook and/or notches on either end. Generally speaking, while providing an ability for prying a brake shoe retaining spring away from the brake shoe, the device still does not provide for holding the retaining spring in a released position for ease of brake shoe removal and replacement. Also, they do not provide for simultaneous operations with two released and held brake springs, nor do they facilitate re-engagement of springs to shoes. See, for example, Part No. 3365 "Brake Spring Pliers" manufactured for NAPA Distribution Centers by Danaher Tool Group, Lancaster, Pennsylvania, and Part No. J 38400 "Brake Shoe Spanner & Spring Remover" by the Kent-Moore Company. Such GM brake shoe spanner and spring remover product available in the marketplace comprises a similar X-shaped scissoraction device more than a foot long. It is marketed through Kent-Moore company, originating as Part No. J 38400 by OTC, a division of SPX Corporation of Owatonna, Minn. 55060-1171.

SUMMARY OF THE INVENTION

The present invention recognizes and addresses various of the foregoing drawbacks, and others, concerning brake maintenance operations in general, and in particular, maintenance operations for drum brake arrangements. Thus, broadly speaking, one main object of this invention is improved brake maintenance operations.

It is another principal object of the present invention to provide an improved tool for facilitating drum brake maintenance operations, and to provide corresponding improved methodology for conducting maintenance operations using such a tool of the present invention.

It is another object of the present invention to provide an improved brake maintenance tool which facilitates both relieving and holding of brake springs, to facilitate maintenance operations for drum brake arrangements.

It is a further more particular object of the present invention to provide a tool which safely releases and holds both brake springs of a pair of brake springs in a conventional drum brake arrangement, both for safety of the automotive technician and for improved brake maintenance operations. Thus, one more specific object is to improve safety (through predictable, manageable operations) while still reducing the amount of time required for conducting drum brake maintenance operations.

Still another present object is to provide a low cost tool capable of practice of the present invention and with the present methodology.

It is another object to provide a tool which is highly reliable, both as to safety of operation and in its ability to release and hold brake springs, when used in accordance with the presently disclosed methodology.

Additional objects and advantages of the invention are set forth in, or will be apparent to those of ordinary skill in the art from, the detailed description herein. Also, it should be further appreciated that modifications and variations to the specifically illustrated and discussed features, steps, or materials and devices hereof may be practiced in various embodiments and uses of this invention without departing from the spirit and scope thereof, by virtue of present reference thereto. Such variations may include, but are not limited to, substitution of equivalent means, features, materials, or steps for those shown or discussed, and the functional or positional reversal of various parts, features, steps, or the like.

Still further, it is to be understood that different embodiments, as well as different presently preferred embodiments, of this invention may include various combinations or configurations of presently disclosed features, steps, or elements, or their equivalents (including combinations of features or steps or configurations thereof not expressly shown in the figures or stated in the detailed description). One exemplary such embodiment of the present invention relates to a tool for releasing and holding brake springs to facilitate maintenance operations for a drum brake arrangement, including main support means and combined therewith retraction means, in accordance with the invention.

Such main support means may be provided for removably resting on the exposed wheel flange of a vehicle wheel drive assembly of the type having a drum brake arrangement. The above-referenced exemplary retraction means may be operatively supported on such main support means, and provided for controlled retracting and holding of at least one brake spring associated with a brake shoe of the drum brake arrangement.

With the foregoing arrangement, advantageously, the drum brake shoes of the drum brake arrangement with which such tool is used may be selectively released from tension from their respective brake springs by controlled actuation of such exemplary retraction means. Therefore, practice of such embodiment provides for ease of access and disassembly of the drum brake arrangement.

Another present exemplary embodiment concerns a brake spring retraction tool for use in drum brake maintenance operations. Such an exemplary tool may include a main support bar, a pair of retractable elements, a pair of brake spring engagement means, and a pair of actuation means.

In the foregoing exemplary brake spring retraction tool, the main support bar may comprise for example a generally rigid element adapted to be received on an exposed wheel mounting member of a vehicle wheel drive assembly of the type having drum brakes, with such rigid element further defining a pair of receiving holes therethrough and respectively spaced thereon in predetermined locations. The above-referenced pair of retractable elements may be received respectively in such pair of receiving holes. The pair of brake spring engagement means may be situated on the respective retractable elements. Still further, the pair of actuation means may be associated with the respective retractable elements for selectively and controllably retracting such retractable elements whenever the main support bar is positioned such that the pair of brake spring engagement means are engaged with respective brake springs of a vehicle wheel drive assembly with which the tool is associated. With such tool operations, the brake springs may be selectively lifted and held so as to permit ease of removal and replacement of the brake shoes with which the brake springs are associated and so as to permit access to and disassembly of other components of the drum brake arrangement for ease of their maintenance also.

Still further, it is to be understood that the subject invention equally encompasses corresponding methods of use of the present exemplary tools, and, generally, improved methodologies for drum brake maintenance operations. One exemplary embodiment of a method in accordance with the subject invention for facilitating drum brake maintenance operations may include the steps of, for example:

providing a spring retraction tool having a generally rigid main body and two respective retractable members positioned so as to simultaneously engage a respective pair of brake springs of a drum brake arrangement whenever such tool is positioned on an exposed wheel flange;

seating such tool on the exposed wheel flange in a predetermined position with the retractable members engaged with the respective brake springs;

retracting the retractable elements a predetermined distance so as to release the respective brake springs from engagement thereof with a pair of respective brake shoes, and so as to hold both of the released brake springs in such retracted and released positions to permit extraction of the respective brake shoes;

selectively removing the extractable brake shoes and conducting drum brake maintenance operations;

returning a pair of brake shoes into operative position in the drum brake arrangement;

extending the retractable elements to reverse the retracting thereof so as to re-engage the respective brake springs with the respective brake shoes; and removing the tool from the exposed wheel flange.

Those of ordinary skill in the art will better appreciate the features and aspects of such embodiments, methods, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a generally front and partially top perspective view of a conventional wheel drive assembly having a drum brake arrangement, with a first exemplary embodiment of a tool in accordance with the subject invention positioned as ready to be used in association with the wheel drive assembly in accordance with the present method;

FIG. 2 is a generally front and partially bottom perspective view of the conventional wheel drive assembly illustrated in present FIG. 1, further with the exemplary first embodiment of the subject tool of the present invention, as represented in FIG. 1, positioned in relation to the wheel drive assembly in accordance with features of the present method;

Figure 3:
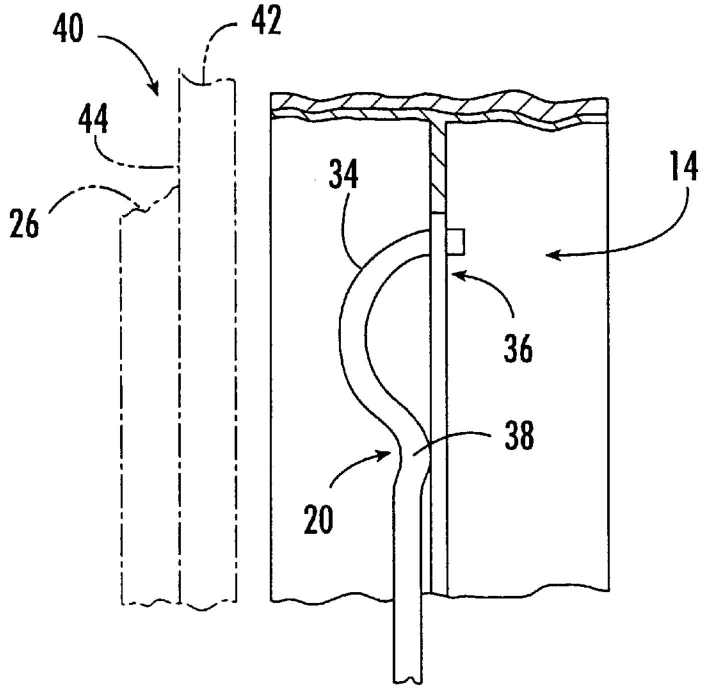
FIG. 3 is an enlarged, partial cross sectional view of a portion of the conventional wheel drive assembly as shown in present FIG. 1, and taken along the sectional line 3—3 indicated therein, and focused on engagement of a conventional brake spring with a conventional brake shoe thereof.

Repeat use of reference characters throughout the present specification and appended drawings is intended to represent same or analogous features, elements, or steps of the invention.

DETAILED DESCRIPTION OF THE PREFERRED EMBODIMENTS

Reference will now be made in detail to the presently preferred embodiments of the invention, two complete examples of devices of which are fully illustrated in the accompanying drawings. Such drawings also represent the present methodology, as used with either of such present exemplary device embodiments. Each such device example is provided by way of an explanation of the invention, as well as to the present methodology, not as limitations of the invention.

In fact, it will be apparent to those skilled in the art that various modifications and variations can be made in the present exemplary devices, and in the present methodology. For example, features illustrated and described as part of one embodiment may be used with other embodiments to yield still further embodiments, or used with various methodologies in accordance with this invention. Additionally, certain features may be interchanged with similar devices or steps simply not yet determined which in fact perform the same or similar functions.

As discussed above, the present invention is particularly concerned with improvements in brake spring maintenance for drum brake arrangements. FIG. 1 represents one exemplary embodiment generally 10 of a tool in accordance with the subject invention for releasing and holding brake springs to facilitate maintenance operations for a drum brake arrangement.

FIG. 1 further represents a typical such drum brake arrangement generally 12, in which a pair of conventional removable brake shoes 14 and 16 are situated for operational interface with a rotating drum generally 18. Respective conventional brake springs 20 and 22 are respectively associated with brake shoes 14 and 16. Such conventional springs 20 and 22 generally may comprise resilient cantilevered elements, supported near lower ends thereof in an area generally 24 of the drum brake arrangement 12.

FIG. 1 illustrates a generally front and partially top perspective view of drum brake arrangement 12, with the exemplary embodiment of tool 10 separated therefrom. In FIG. 1, tool 10 is prepared to be appropriately positioned relative to springs 20 and 22, as shown in FIG. 2. As illustrated in FIG. 2 (with a generally front and partially bottom perspective view of drum brake arrangement 12), tool generally 10 per present methodology is removably rested on an exposed wheel flange generally 26 in accordance with the invention.

More particularly, a main support means generally 28 in accordance with the invention may comprise a generally rigid main body, preferably such as a metal workpiece. A straight or relatively flat surface of such body 28 provides operative support for retraction means generally 30 and 32 associated therewith in accordance with the invention. Retraction means 30 and 32 are provided for controlled retraction and holding of the respective brake springs 20 and 22 associated with the respective brake shoe elements 14 and 16 of the drum brake arrangement generally 12. With function of such retraction means, the respective brake springs 20 and 22 may be selectively released from the tension they otherwise apply to their respective brake springs 14 and 16, for ease of access disassembly of the drum brake arrangement 12, as discussed hereinafter.

Figure 4:
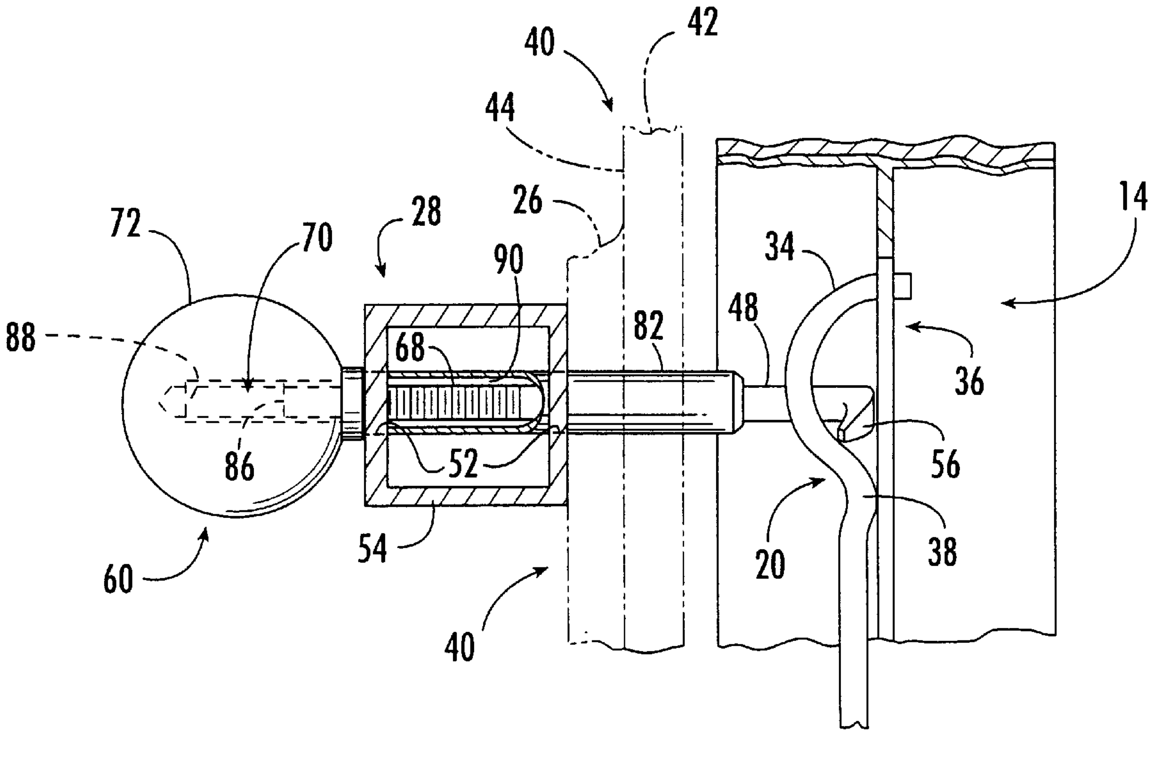
FIG. 4 is a cross sectional view similar to that of present FIG. 3, taken along the sectional line 4—4 in present FIG. 2, and representing association of the first embodiment of the subject tool in accordance with this invention with the conventional wheel drive assembly as illustrated.
Figure 5:
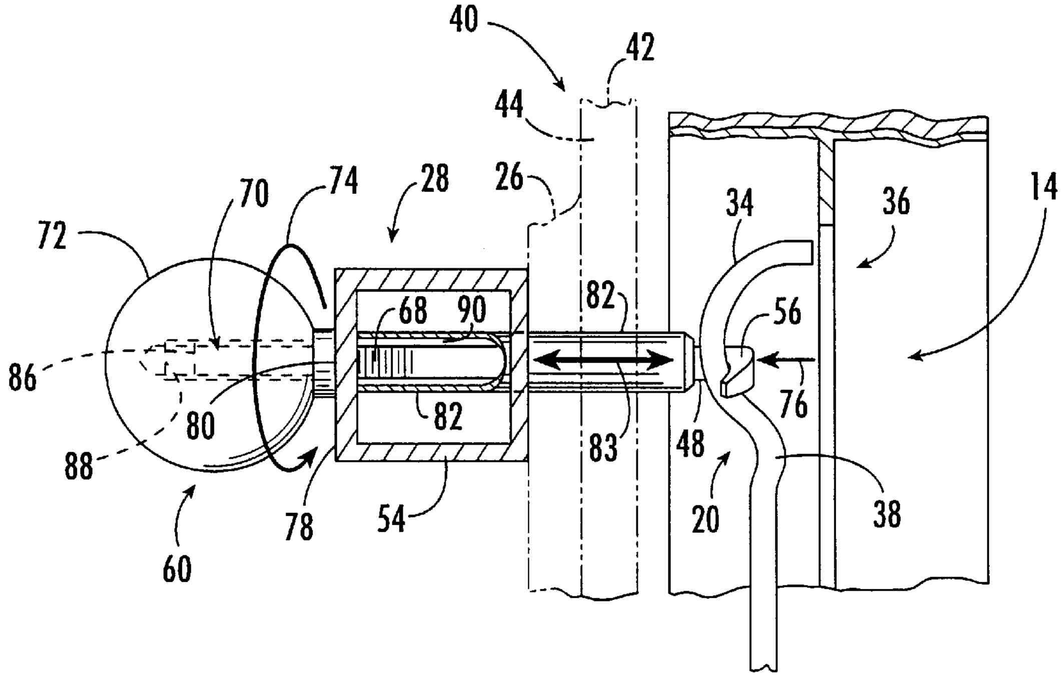
FIG. 5 is a cross sectional view from the same perspective as that of present FIG. 4, and representing particular aspects of improved maintenance operations resulting from practice of the subject invention, particularly representing release of a brake spring relative to its corresponding brake shoe.

FIGS. 3 through 5 represent various cross sections of the drum brake arrangement and/or exemplary embodiment of tool 10 in accordance with the invention, as illustrated in present FIGS. 1 and 2. More specifically, FIG. 3 shows an enlarged cross section of a portion of the cooperative paired brake shoe 14 and brake spring 20, as shown by the section line 3—3 in present FIG. 1. Present FIG. 2 includes a section line 4—4 indicating the cross sectional perspective of the FIG. 4 illustration. The FIG. 5 illustration is taken from the same vantage point as that of FIG. 4, and represents other functional aspects of practice of the present invention, as discussed hereinafter.

FIG. 3 illustrates the "free" or movable end generally 34 of brake spring 20 which resiliently engages a correspondingly formed opening therefor generally 36 in brake shoe 14. By such engagement, the tension of conventional brake spring 20 holds conventional brake shoe 14 in a desired position relative to the overall brake shoe arrangement generally 12.

It should be noted that those of ordinary skill in the art are regarded as being completely familiar with conventional drum brake arrangements generally 12, including the interrelationship and function of conventional brake shoes and brake springs, the full details of which are not otherwise addressed herein. For example, FIG. 3 represents the fact that another portion (generally curved protrusion 38) of brake spring 20 also is involved with the engagement of positioning of brake shoe 14. Generally speaking, such specific details (fully known to those of ordinary skill in the art) form no particular aspect of the subject invention, apart from the description herein.

FIG. 3 further represents in dotted line the generally exposed wheel mounting member 40 which exists in a conventional vehicle wheel drive assembly whenever the vehicle wheel is removed. As known, the exposed such arrangement includes an extending exposed wheel flange generally 26 which extends from a circular or rotating member generally 42 having a flat annular surface generally 44 against which the vehicle wheel is received for mounting. As is also shown in FIGS. 1 and 2, and as is known to those of ordinary skill in the art, projecting bolts generally 46 are integrally formed with or secured to such surface 44, and receive corresponding openings in the vehicle wheel. Bolts 46 subsequently receive "lug nuts" (not shown) for securing a conventional wheel and tire in a mounted position on a vehicle wheel drive assembly. For purposes of the present invention, specific wheel mounting and removal steps form no particular part of the present device and methodology. In other words, it is assumed that the wheel and tire are already removed for brake maintenance operations.

FIGS. 4 and 5 represent exemplary tool embodiment 10 in generally its mounted or functional position. In the exemplary embodiment shown, a pair of retractable elements 48 and 50 are respectively received in a corresponding pair of receiving holes (generally 52) formed in main support bar 28. As represented in FIGS. 4 and 5, main support bar 28 may preferably comprise a predetermined length of generally straight metal tubing 54, such as hollow, rectangular tubing. In such instance, the receiving holes 52 include a pair (two sets) of passageways formed entirely through the periphery of such metal tubing.

Still further with reference to FIGS. 1, 2, 4, and 5, exemplary tool embodiment 10 may include a pair of brake spring engagement means (such as hooked ends 56 and 58) respectively, for retractable elements 48 and 50.

Actuation means generally 60 and 62 are respectively associated with retractable elements 48 and 50 for selectively and controllably retracting such retractable elements whenever the main support bar generally 28 is positioned such that the pair of brake spring engagement means (hooked ends 56 and 58) are engaged with their respectively aligned brake springs of the vehicle wheel drive assembly with which the tool 10 is associated. With such function, the brake springs 20 and 22 may be selectively lifted and held so as to permit ease of the removal and replacement of the brake shoes 14 and 16 with which the brake springs are associated, and so as to permit access to and disassembly of other components of the drum brake arrangement for ease of maintenance thereof. A self-adjusting brake spring element generally 64 and a brake adjuster element generally 66 are examples of other such components which may be better accessed with practice of the present invention (see also FIG. 6).

As better shown by the cross sectional views of present FIGS. 4 and 5, the retractable element 48 (and retractable element 50) may comprise a pair of metal pins with screw threads 68. Such screw threads 68 preferably surround at least a portion of the respective outside diameters of the metal pins. With such an embodiment, the actuation means generally 62 may preferably comprise respective threaded nut elements 70 for respective function association with the screw threads 68 of the metal pins. In the exemplary embodiment of tool 10, such threaded nut elements may further comprise a generally rounded knob 72 for ease of actuation. A multi-faceted knob may be practiced in this or other embodiments.

Considered together, FIGS. 1 through 5 represent the basic improved method of facilitating drum brake maintenance operations which may be achieved through practice of the present invention. The spring retraction tool generally 10 having a generally rigid main body 28 may be positioned relative to the conventional drum brake arrangement 12. While embodiments addressing at least one brake spring are more broadly included within the present invention, preferably the spring retraction tool provides respective retractable members positioned in predetermined locations so as to simultaneously engage a respective pair of brake springs of the drum brake arrangement whenever the tool is positioned on an exposed wheel flange, such as in present FIG. 2.

In the foregoing arrangement, the retractable members are respectively spaced in predetermined locations by the tool main body 28, for preferred respective alignment with the paired brake springs 20 and 22. When so provided and properly seated on the exposed wheel flange in a predetermined position (such as in FIG. 2) one or both of the retractable members may then engage its respective brake spring, as represented in present FIG. 4. Then, through actuation of the retractable element, in accordance with the present invention, the section 34 of the brake spring 20 may be retracted a predetermined distance so as to release the brake spring from its engagement with its respective brake shoe, such as 14.

Arrows 74 and 76 in FIG. 5 represent turning of knob 72 and corresponding retraction of element 48 and engaging hooked end 56 thereof, so as to release brake spring 20 from brake shoe 14. As understood by those of ordinary skill in the art, rotation of knob 70 cooperates with either an outer surface 78 of main support means 28, or with an end 80 of a cylindrical collar 82 which may be provided about the element 48 to shield such element from any binding thereof due to any forces lateral to the longitudinal axis 83 of such element 48 (see FIG. 5). As will be appreciated by those of ordinary skill in the art, a further cylindrical collar 84 may similarly be provided for use in relation to element 50.

As will be further appreciated by those of ordinary skill in the art, engagement between hooked end 56 and portion 34 of brake spring 20 generally keeps element 48 from rotating as knob 72 is turned. Whenever knob 72 is properly rotated, such fact (engagement of hook 56 with element 34) causes element 48 to be drawn in a retracting direction (arrow 76) along its longitudinal axis 83. A predetermined displacement distance of about one inch has been determined as working well for releasing brake shoe 14.

As will be further understood from the present disclosure, for example, from the arrangement of FIG. 5 and corresponding methodology, practice of the present invention permits the retracted brake spring 20 to be held in such retracted position, for ease of maintenance operations without otherwise requiring the technician's attention in order to continue holding brake spring 20 in such retracted position. Subsequent to completion of maintenance operations (for example, reinsertion of a new or treated brake shoe 14), the retracting direction of element 48 may be reversed by simply reversing the rotational direction of knob 72, whereupon the natural resiliency of brake spring 20 will otherwise cooperate with the arrangement to permit portion 34 to become re-engaged with portion 36 of brake spring 14.

It is to be understood and appreciated that completely analogous operations may be simultaneously undertaken, or at different times, with the other retracting operation involving element 50 and retraction means 32.

Figure 6:
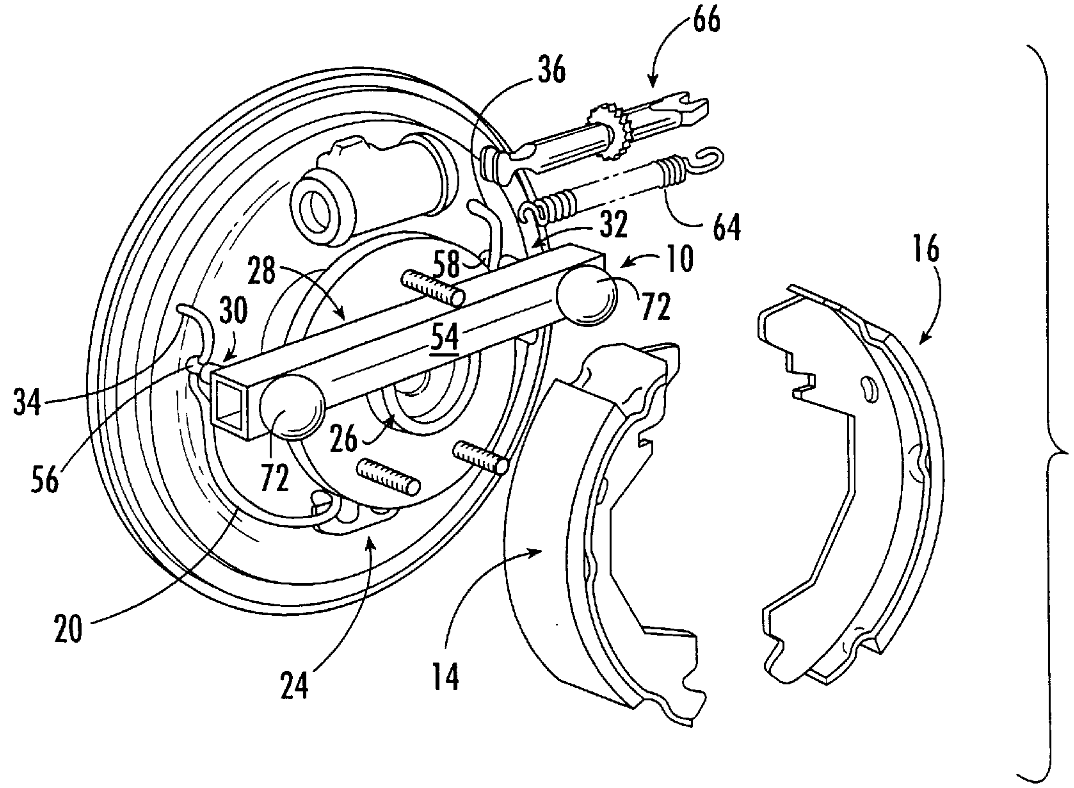
FIG. 6 is a generally front and partially left side perspective view, in partially exploded condition, showing various conventional brake elements removed such as during maintenance thereof and during practice of the present invention.

FIG. 6 illustrates a generally front, partially left side perspective view, in which drum brake maintenance operations are underway in accordance with the present methodology, with practice of the present exemplary tool 10.

In general, removable components of a conventional drum brake arrangement are shown in exploded view, including brake shoes 14 and 16, self-adjusting brake spring 64, and brake adjuster element 66.

More particularly with respect to use of exemplary tool 10, such tool is shown in FIG. 6 in a seated position on an exposed flange member 26. Furthermore, hooked ends 56 and 58 of retraction means 30 and 32, respectively, are engaged with ends 34 and 36 of respective conventional brake springs 20 and 22. In addition to being so engaged, the retraction means have been operated so as to respectively retract elements 34 and 36. Still further, FIG. 6 represents such retracted elements being automatically held in place with operation of tool 10, in accordance with the present methodology. Such arrangement completely frees both hands of a technician or other person performing drum brake maintenance operations.

As will be well understood by those of ordinary skill in the art, brake shoes 14 and 16, and the other components (for example, 64 and 66) may be reinserted (either after maintenance or with new brake shoes in place) while the brake springs continue to be held as represented in present FIG. 6. Thereafter, the pair of respective knobs 72 may be properly actuated for extending the retraction means so as to reengage the respective brake springs 20 and 22 with brake shoes 14 and 16.

Figure 7:
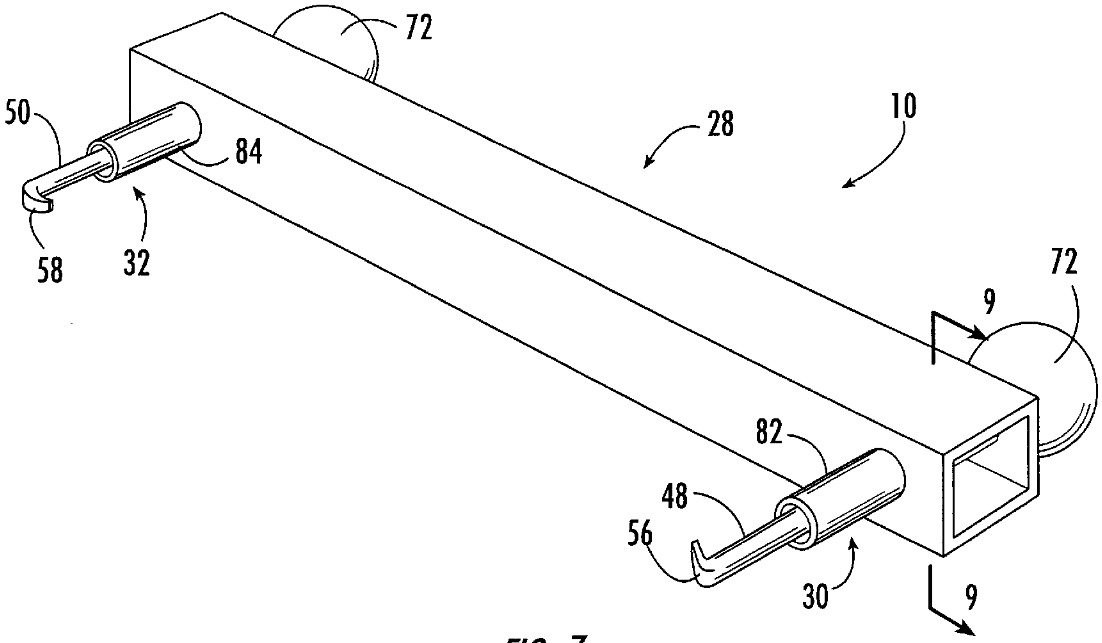
FIG. 7 is a generally top, back, and left end perspective view of the first exemplary embodiment of a subject tool in accordance with the subject invention, as represented in FIGS. 1, 2, and 4 through 6, disassociated from any conventional wheel drive assembly.
Figure 9:
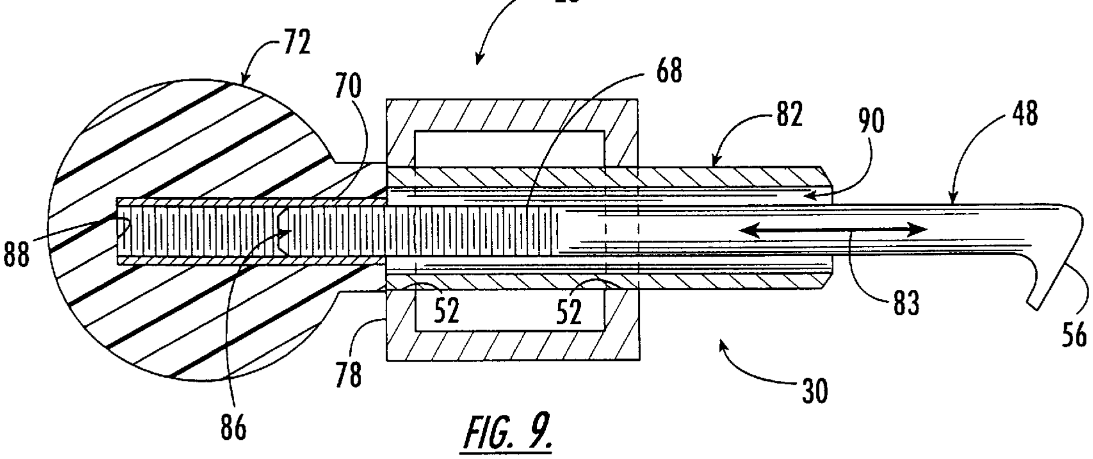
FIG. 9 is an enlarged cross sectional view of the first exemplary embodiment of a maintenance tool in accordance with the subject invention as represented in present FIG. 7, taken along the sectional line 9—9 indicated therein.

FIG. 7 shows a generally top, back, and left end perspective view of the first exemplary embodiment of tool 10, in accordance with the present invention, and as further described above with reference to FIGS. 1, 2, and 4 through 6. FIG. 9 also represents an enlarged cross sectional view of a portion of the FIG. 7 embodiment, as taken along the sectional line 9—9 indicated therein.

As represented in such figures, and others, main support means 28 may preferably comprise a generally rigid metal workpiece, such as a hollow square tubing. With such an arrangement, a pair of receiving holes generally 52 (see FIG. 9) may be formed through the outer periphery of the square tubing for receipt of retraction elements, as discussed above. Pins 48 and 50 may be provided with respective hooked ends 56 and 58. Such pins also may include respective threaded portions 68 for interaction with corresponding screw threads 70 of actuation knob 72.

As further represented more specifically in FIGS. 4, 5, and 9, an end 86 of pin 48 opposite to end 56 thereof may travel in an axial direction 83 within the threaded portion 70 of actuation knob 72, until engaging an end of travel generally 88 thereof. A predetermined travel distance of about one inch is generally preferred for adequate lifting and holding of the respective brake springs 20 and 22 relative to brake shoes 14 and 16. For example, an actuation knob 72 with a diameter of about 1.25 inches is adequate to accommodate such a range of axial travel of pin 48. Pin 48 (and pin 50) itself may be preferably in a range of from about 2.5 inches to about 3 inches in length, and comprise 3⁄16 inch case hardened steel. A plastic or rubberized knob 72 is typically adequate for practice of the present invention. Aluminum tubing is a preferred choice for main support means 28, for providing adequate strength with a relatively light weight material for ease of handling and for low costs. Equivalent alternative materials may be practiced in all instances, as considered appropriate by those practicing the present invention.

As further represented in the figures, a generally cylindrical collar 82 may be provided for being situated within openings 52, with the pin 48 (or 50) received therein. As represented, an inside diameter of at least 0.25 inches for such cylindrical collar 82 may be preferred, to facilitate ease of axial travel (direction arrow 83) of pin 48 (or 50) therein.

FIGS. 4 and 5 illustrate partial cutaway of cylindrical element 82 and FIG. 9 illustrates a full sectional view thereof, to illustrate an annular gap 90 which may be provided in accordance with the subject invention between collar 82 and pin 48 (and pin 50) for ease of travel.

As represented in the figures, the end 56 of pin 48 is susceptible to receiving forces thereon from spring 20 in directions having at least a partial force direction lateral to the longitudinal axis 83 of pin 48. Without cylindrical collar 82, it is possible that such lateral forces could cause pin 48 (or pin 50) to bind during axial travel 83 thereof. While in the broader context certain embodiments of the subject invention may be provided without use of such protective cylindrical collar features 82, generally speaking, use of such collar arrangement is preferred for improved axial travel of the retractable elements.

The present figures represent another aspect of the subject invention with respect to use of two retractable elements, in that they are supported by the main support means generally 28 in predetermined locations suitable for interaction with the respective brake springs 20 and 22. More specifically, openings 52 having an inside diameter of about one-half inch may be provided center-to-center at a distance from one another in a range of from about 6.5 inches to about 7.0 inches, and more preferably from about 6.75 inches to about 6.875 inches. In such an embodiment, a total length of main support bar 28 of about 9 inches is preferred. Generally speaking, in accordance with the present invention, either shorter or longer lengths may be utilized (for example, down to 7.5 inches), so long as the above-referenced predetermined locations are provided for the respective retractable elements. An aluminum tubing sidewall thickness of about 1⁄8 inches is one adequate example in an aluminum construction.

With the foregoing arrangements, tool 10 is particularly adapted for use in performing drum brake maintenance operations for rear wheel drum brake assemblies of 1992 through 1997 model General Motors vehicles.

Figure 8:
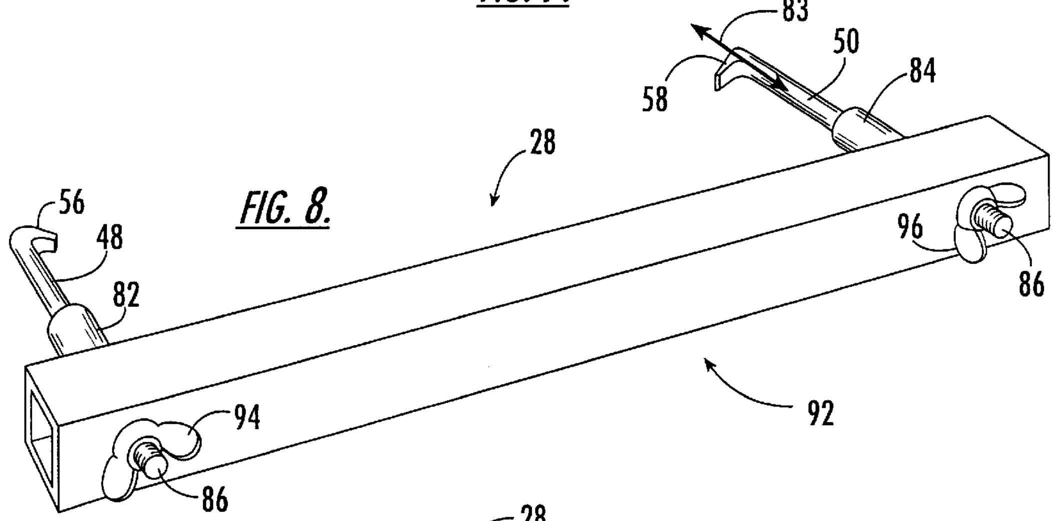
FIG. 8 is a generally top, front, and partially left end perspective view of a second exemplary embodiment of a maintenance tool in accordance with the subject invention, disassociated from any conventional wheel drive assembly.

It is to be understood that variations and modifications may be practiced. For example, FIG. 8 illustrates a generally top, front, and partially left end perspective view of a second embodiment generally 92 of an exemplary tool in accordance with the present invention. In such arrangement, respective threaded wing nuts 94 and 96 are provided in place of actuation knobs 72. With such an arrangement, the predetermined distance of axial travel 83 of pins 48 and 50 is generally less restricted, and depends more on the length of the axial threaded portion thereof as opposed to the penetration of end 86 into an actuation knob.

It is to be further understood that other "nut" or "knob" arrangements may be practiced, including for example three cornered or four cornered nuts, or other multi-faceted arrangements.

It is to be understood that additional modifications and variations may be practiced. For example, the tool embodiments 10 or 92 of FIGS. 7 and 8, respectively, may in some instances be practiced without use of cylindrical collars 82 and 84. Other shapes of main support bodies may be practiced, and engaging elements other than in the forms of hooks 56 and 58 may be practiced with certain embodiments. Likewise, substitution of equivalent materials performing the same basic functions described herein, may be practiced.

Regardless of the particular embodiment of a tool in accordance with the present invention, practice of the present methodology advantageously results in tremendous time savings over conventional drum brake maintenance operations not making use of such an advantageous tool. For example, it is estimated that as much as 20 to 25 minutes time may be saved per tire over conventional practices through practice of the present invention.

In addition, there is thought to be a significant increase in technician safety, in view of the reliability and predictability of practicing the present methodology.

It is to be further understood that variations to such tool and methodology may be practiced in combination. For example, certain embodiments may involve a single retractable element and resulting maintenance operations with a corresponding approach.

While particular embodiments of the invention, both apparatus and method, have been described and shown, it is to be understood by those of ordinary skill in the art that the present invention is not limited thereto since many modifications may be made, some of which are suggested above. Therefore, it is intended to cover any and all such embodiments that may fall within the scope of the invention and the appended claims.

What is claimed is:

1. A tool for releasing and holding brake springs to facilitate maintenance operations for a drum brake arrangement, comprising:

main support means for removably resting on an exposed wheel flange of a vehicle wheel drive assembly having a drum brake arrangement;

retraction means having a longitudinal axis and an operative length extending therealong from a surface of said main support means; and, a collar laterally fixed to said main support means, the collar surrounding a portion of the retraction means along at least about one half of said operative length, said retraction means being laterally displacable within said collar so as to guide movement of said retraction means along said longitudinal axis, thereby preventing binding of said retraction means from any forces lateral to said longitudinal axis;

wherein said retraction means provides for controlled retracting and holding of at least one brake spring associated with a brake shoe of the drum brake arrangement, so that the drum brake shoes of the drum brake arrangement with which said tool is used may be selectively released from tension from their respective brake springs by controlled actuation of said retraction means, for ease of access and disassembly of the drum brake arrangement.

2. A tool as in claim 1, wherein:

said main support means defines at least one opening therein for receipt of said retraction means; and said retraction means includes at least one pin received in said main support means opening, said pin having a hooked end for engagement with a brake spring and having screw threads, said retraction means further including a threaded nut element operatively associated with said pin screw threads.

3. A tool as in claim 2, wherein:

said main support means further defines a second opening therein; and said retraction means includes a second pin received in said main support means second opening, said second pin having a hooked end for engagement with a brake spring and having screw threads, said retraction means further including a second threaded nut element operatively associated with the pin screw threads of said second pin.

4. A tool as in claim 3, wherein:

said main support means comprises a metal workpiece with said openings defined therethrough at a predetermined distance apart; and wherein said pins have a predetermined length such as to permit obtaining at least a predetermined retraction distance by respective actuation of said threaded nut elements.

5. A tool as in claim 4, wherein said predetermined distance apart of said openings is in a range of from about 6.5 inches to about 7.0 inches, said predetermined length of said pins is at least about 2.5 inches, and said predetermined retraction distance is at least about 1 inch.

6. A tool as in claim 5, wherein said threaded nut elements comprise generally round knobs defining respective interior threaded spaces for receiving said pins in threaded engagement with said screw threads thereof.

7. A tool as in claim 6, wherein said predetermined length of said pins is about 3 inches, respectively.

8. A tool as in claim 3, further including a second collard laterally fixed to said main support and about said second pin, so as to guide movement of said second pin along the second pin longitudinal axis, to prevent binding of said second pin from any forces lateral to the second pin longitudinal axis.

9. The tool according to claim 8, wherein said second collar is generally cylindrical.

10. The tool according to claim 1, wherein said collar is generally cylindrical.

11. A brake spring retraction tool for use in drum brake maintenance operations, comprising:

a main support bar comprising a generally rigid element adapted to be received on an exposed wheel mounting member of a vehicle wheel drive assembly having drum brakes, said rigid element further defining a pair of receiving holes therethrough and respectively spaced thereon in predetermined locations;

a pair of retractable elements configured to resist lateral forces, received respectively in said pair of receiving holes and each individual retractable element having a longitudinal axis an operative length extending there along from said main support bar;

a first and a second collar laterally fixed to said support bar, each said first and said second collar surrounding a portion of a respective retractable element along at least about one half of said operative length, each said individual retractable elements being laterally displacable within said respective collar so as to guide movement of said retractable element along the longitudinal axis of each individual retractable element, thereby preventing binding of said each retractable elements from any force lateral to said longitudinal axis;

a pair of brake spring engagement means situated on said respective retractable elements; and a pair of actuation means associated with said respective retractable elements for selectively and controllably retracting said retractable elements whenever said main support bar is positioned such that said pair of brake spring engagement means are engaged with respective brake springs of a vehicle wheel drive assembly with which said tool is associated, so that the brake springs may be selectively lifted and held so as to permit ease of removal and replacement of the brake shoes with which the brake springs are associated and so as to permit access to and disassembly of other components of the drum brake arrangement for ease of maintenance thereof.

12. A tool as in claim 11, wherein:

said pair of retractable elements comprise a pair of metal pins with screw threads surrounding at least a portion of their respective outside diameters; and said actuation means comprise respective threaded nut elements for respective functional association with said screw threads of said metal pins.

13. A tool as in claim 12, wherein said threaded nut elements comprise one of a generally round knob and a multi-faceted knob.

14. A tool as in claim 13, wherein said pair of brake spring engagement means comprise respective hooked ends on said pins.

15. A tool as in claim 12, wherein said main support bar comprises a predetermined length of generally straight metal tubing, and said receiving holes include a pair of passageways formed entirely through the periphery of said metal tubing.

16. A tool as in claim 15, wherein said metal tubing comprises a section of generally rectangular tubing having a length of at least about 7.5 inches, and wherein said passageways have central axes respectively therethrough which are separated by a predetermined distance in a range of from about 6.5 inches to about 7.0 inches.

17. A tool as in claim 15, wherein said first collar and said second collar are generally cylindrical.

* * * * *